United States Patent [19]
Hoge et al.

[11] Patent Number: 5,371,644
[45] Date of Patent: * Dec. 6, 1994

[54] SELF IDENTIFYING UNIVERSAL DATA STORAGE ELEMENT WITH HUMAN INTELLIGIBLE WRITE PROTECT MECHANISM

[75] Inventors: David T. Hoge, Westminster; John C. Owens, Arvada, both of Colo.; Michael W. Johnson, Cottage Grove, Minn.

[73] Assignees: Storage Technology Corporation, Louisville, Colo.; Minnesota Mining and Manufacturing Company, St. Paul, Minn.

[*] Notice: The portion of the term of this patent subsequent to Aug. 24, 2010 has been disclaimed.

[21] Appl. No.: 115,135

[22] Filed: Sep. 1, 1993

Related U.S. Application Data

[63] Continuation-in-part of Ser. No. 870,578, Apr. 17, 1992, Pat. No. 5,239,437, which is a continuation-in-part of Ser. No. 744,456, Aug. 12, 1991, abandoned.

[51] Int. Cl.⁵ .............................................. G11B 15/04
[52] U.S. Cl. ..................................... 360/132; 360/133
[58] Field of Search ................. 360/132, 95, 134, 131, 360/133; D14/121–123

[56] References Cited

U.S. PATENT DOCUMENTS

| D. 331,053 | 11/1992 | Zucker et al. | D14/115 |
| 5,210,671 | 5/1993 | Blackston | 360/133 |
| 5,239,437 | 8/1993 | Hage et al. | 360/132 |

*Primary Examiner*—Paul M. Dzierzynski
*Assistant Examiner*—Don Wong
*Attorney, Agent, or Firm*—Sterne, Kessler, Goldstein & Fox

[57] ABSTRACT

A mechanism for defining a write protect state of a data storage media enclosed in a housing of a data storage element is disclosed. The mechanism includes an aperture formed in an exterior surface of the housing, wherein the aperture has a first region and a second region. A member is movably secured within the aperture and is manually moveable between a first position wherein the member is positioned proximate the aperture first region, and a second position wherein the member is positioned proximate the aperture second region. A first human intelligible mark is placed on the housing proximate the aperture first region. The first human intelligible mark depicts a portion of a predetermined symbol corresponding to one of a write enabled state and a write protect state of the data storage media. A second human intelligible mark is placed on the member. The second human intelligible mark depicts a remaining portion of the symbol. The second human intelligible mark is alignable with the first human intelligible mark by moving the member into the first position. When the first and second human intelligible marks are aligned, the first and second human intelligible marks depict an unbroken image of the symbol, thereby indicating that the data storage media is in the one of the write enabled state and the write protect state. When the first and second human intelligible marks are not aligned, the first and second human intelligible marks depict a broken image of the symbol, thereby indicating that the data storage media is in another of the write enabled state and the write protect state of the data storage media.

7 Claims, 4 Drawing Sheets

SELF IDENTIFYING UNIVERSAL DATA STORAGE ELEMENT WITH HUMAN INTELLIGIBLE WRITE PROTECT MECHANISM

CROSS REFERENCE TO RELATED APPLICATIONS

This is a continuation-in-part application of a U.S. patent application, entitled "Self Identifying Universal Data Storage Element", Ser. No. 07/870,578, filed Apr. 17, 1992, now U.S. Pat. No. 5,239,437, which is a continuation-in-part of U.S. patent application Ser. No. 07/744,456, filed Aug. 12, 1991, now abandoned.

BACKGROUND OF THE INVENTION

1. Field of the Invention

This invention relates to data storage systems and, in particular, to a data storage element form factor having substantially uniform exterior dimensions and containing media of variable type and configuration, which media or states thereof is identified by the use of indicia on the exterior of the data storage element housing.

2. Related Art

It is a problem in dam processing systems to provide data storage capacity that is adaptable to the varying needs of the computer system. Existing data storage systems are inflexible, based on a single type of media that has predetermined mechanical, electrical, and operational constraints. A computer system user must therefore purchase a mixture of data storage systems to match the data storage capabilities with the nature of the data stored thereon. The selection of a dam storage system also forces the user to restrict the media to a type that matches the installed data storage system. Often, the cost of additional incompatible data storage systems is prohibitive. The transition from one media to another is generally controlled by the need to change one of the primary data storage system characteristics such as volumetric efficiency of data stored per unit of space occupied, access performance (e.g. load, search, transfer times, etc.), cost, reliability, archival data storage capabilities (e.g. shelf life, environmental hardness, format standards, etc. ), or management (e.g. media interchange, automated handling, catalogue systems, physical facilities, etc.).

For removable media types, the effects of such transitions are exacerbated by the use of large automated library systems. An example of these automated library systems is the 4400 Automated Cartridge System manufactured by Storage Technology Corporation, which provides economical and efficient handling of thousands of the industry standard 3480-type magnetic tape cartridges for an associated plurality of tape cartridge drive systems. An automated library system requires the user to commit to a significant investment in 3480-type tape cartridges and tape drives. The robotic media handling elements in an automated library system typically can not handle diverse types of media, since such robots are designed to handle a specific media having a specific form factor. Furthermore if it were possible to introduce different media of similar form factor, media management requires a way to identify and differentiate individual media units. Thus, while the automated library system provides tremendous data storage and data retrieval improvement, it has the disadvantage of constraining the user to a specific media having a specific form factor since existing removable media are unique and not interchangeable.

Another problem with conventional data storage devices involves their respective write protect mechanisms. A conventional write protect mechanism includes an opening formed in a housing of a data storage device and a member movably secured within the opening. Such a member may, for example, be a tab slidably secured within a slot in the housing. When the tab is in a first position within the slot, writing to the data storage device is enabled (the data storage device is said to be in a write enabled state). When the tab is in a second position within the slot, writing to the data storage device is disabled (the data storage device is said to be in the write protect state). However, in such conventional write protect mechanisms, it is difficult for an operator to remember the relationship between the first and second positions and the write enabled and write protect states. Thus, with such conventional write protect mechanisms, an operator may mistakenly place the data storage device in the write enabled state when the operator intended to place the data storage device in the write protect state, or vice versa.

SUMMARY OF THE INVENTION

The above described problems are solved and a technical advance achieved in the field by the self identifying universal data storage element of the present invention. Existing removable media data storage and retrieval systems, whether manual or robotic, are predicated on the use of removable data storage elements of predefined and uniform external dimensions, internal structure, media and data recording characteristics. The universal data storage element of the present invention presents a data storage element of uniform form factor but that enables the user to vary the contents to include a selection of media types. These media types are used to provide variable data storage and/or recording characteristics.

This universal data storage element also includes coding apparatus to identify the media contents of the universal data storage element. This coding apparatus enables the user to use multiple types of media in an automated library system or a manually operated media storage and retrieval system, since the form factor of all of the data storage elements contained therein is uniform. The universal data storage element includes a plurality of coding apertures on the exterior thereof to automatically identify the data storage capability of the data storage element to ensure that the data storage element is consistent with tile data recording technique used by devices associated with either system.

In the preferred embodiment disclosed herein, the industry standard 3480-type magnetic tape cartridge form factor is used to illustrate the invention. The 3480-type magnetic tape cartridge consists of a substantially rectangular shaped exterior housing which contains a single reel of media, which tape media has a leader block affixed to one end. The leader block is exposed through an opening in the exterior housing of the tape cartridge, for use by an associated tape drive to retrieve the tape media from the tape cartridge. The physical characteristics of the tape media located within this data storage element are identified by a coding arrangement located on the exterior housing of the data storage element. A drive element can thereby decode the media type and, if compatible, access the media stored in the data storage element. The coding identifies the media type without requiring the drive element to first access the media located within the data storage element.

In the disclosed embodiment, the data storage element self identification apparatus consists of a plurality of coding holes or slots arranged in a linear array and located along one edge:: of the exterior housing of the data storage element. These coding holes are placed in the housing during the data storage element manufacturing process to define the type of media contained within the data storage element or various data management characteristics of this media. The coding holes can include a user settable coding hole to indicate the write project status of the magnetic tape contained within the data storage element. This write protect status hole is either open or closed by use of a movable mechanism to enable the user to set the write protect state of the data storage element. Additional coding holes are preprogrammed into the exterior housing of the data storage element. This is generally accomplished by the use of a recess machined into one surface of the exterior housing juxtaposed to the opening through which the leader block is accessed. A premachined block is inserted into the recess during the cartridge manufacturing process. The block contains a plurality of apertures to define the data storage characteristics of this data storage element. Preferably, the premachined block is configured to sandwich a slide mechanism between the premachined block and the housing of the data storage element. The premachined block includes an aperture therein to enable a user to access a projection on the slide mechanism to set the slide in either of two positions which block or open a predefined aperture in the machined block to set the write protect status of the tape media. The premachined block can be color coded to provide a visual indication of the particular pattern of coding holes contained therein and a human readable indicator is preferably provided on the slide mechanism to align with a corresponding human readable mark on the housing when the slide mechanism is set to indicate that the data storage element is not write protected. The drive element can therefore automatically determine whether this data storage element can be processed by simply probing the array of coding holes with a probe element, such as a photodetector or a corresponding array of decoding pins.

Thus, the use of a fixed form factor self identifying universal data storage element enables the user to equip a library system with a plurality of diverse drive elements, each requiring a different type of media. The variability of the media within the universal data storage element and the associated interface elements enables the physical handling of every data storage element in a uniform manner without the likelihood of damage to the drive elements due to the use of these coding holes in the data storage element exterior housing.

The above-noted human readable marks on the moveable mechanism and the housing are represented by a human intelligible symbol which clearly connotes the write protect state of the data storage element. Thus, the present invention provides a human intelligible means for an operator to quickly and easily determine the write protect state of the data storage element, such that mistaken settings of the write protect state of the data storage element by the operator are prevented.

DETAILED DESCRIPTION OF THE PREFERRED EMBODIMENTS

Existing removable media data storage and retrieval systems, whether manual or robotic, are predicated on the use of removable data storage elements of predefined and uniform external dimensions, internal structure, media and data recording characteristics. The universal data storage element of the present invention presents a uniform form factor data storage element but enables the user to vary the contents to include a selection of media types used therein to provide variable data storage and/or recording characteristics. This enables the user to use multiple types of media in an automated library system or a manually operated media storage and retrieval system, since the form factor of all of the data storage elements contained therein is uniform. Mismatch between the media contained in the data storage element and the drive element is prevented by the use of a plurality of coding holes placed on the exterior housing of the dam storage element to identify the physical characteristics of the media contained therein. The drive element automatically senses the presence of a predefined pattern of these holes to determine whether the data storage element can be processed on this drive element.

Universal Data Storage Element Architecture

Figure 1A:
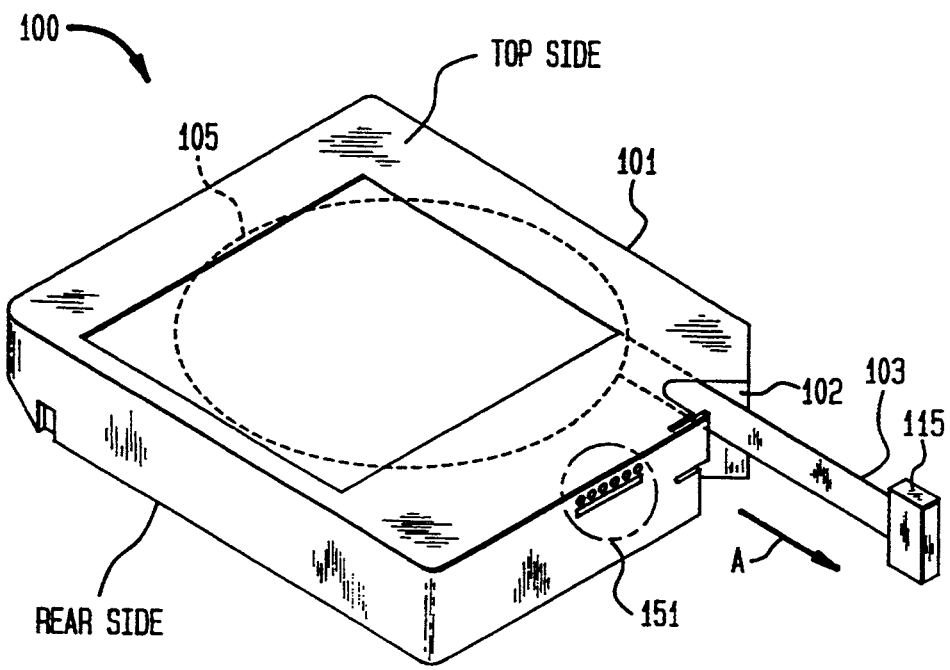
FIG. 1A illustrates the overall architecture of the universal data storage element of the present invention.

FIG. 1A illustrates the overall architecture of the universal data storage element 100. This data storage element 100 consists of a housing 101 that substantially matches the industry standard 3480-type magnetic tape cartridge in exterior dimensions. Housing 101 includes an opening 102 in one corner therein to provide access to the media located within housing 101. Within housing 101, the universal data storage element 100 contains, for example, a reel 105 that: contains a tape media 103, which reel 105 is rotatably affixed to the interior walls of housing 101 on opposite facing interior walls thereof. Tape media 103 is extensible from a loaded position, wherein it is located fully within housing 101, to an extracted position, wherein all or part of tape media 103 is extracted from housing 101 and wound on a take up reel (not shown) located external to housing 101 on a drive element into which the data storage element 100 has been placed.

Media Retrieval

In order to effectuate the extraction of the tape media 103 from housing 101, a leader block 115 is used. This leader block 115 is affixed to one end of the tape media 103 wound on reel 105 to provide a mechanical point of contact for a media withdrawal element in the associated drive element. A mounting pin mechanism in the drive element receives leader block 115 and pulls the associated tape media 103 out of cartridge housing 101 by moving leader block 115 in the direction indicated by arrow A.

Media Variations and Differentiation

Figure 1B:
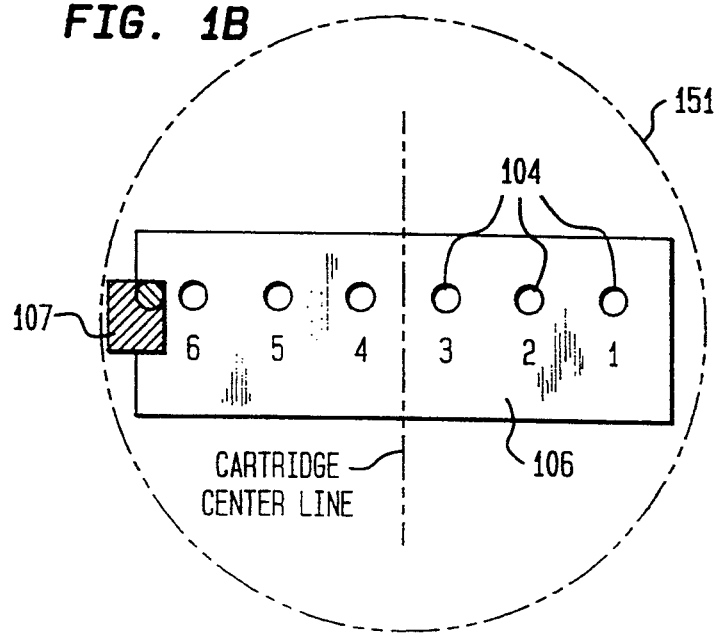
FIG. 1B illustrates in greater detail an array of coding holes positioned on the exterior of the universal data storage element showed in FIG. 1A.

At present, there is only one media type loaded into the commercially available 3480-type magnetic tape cartridge: a longitudinal one-sided magnetic tape. The universal data storage element 100 uses various media types. These media types can include type of tape (magnetic or optical), data recording format (longitudinal or helical), tape dimensions (thick or thin/length of tape on reel), magnetic coating on the tape (iron-oxide or chromium dioxide or barium ferrite), write protection status, etc. There is the potential for damage to the media contained within the universal data storage element 100, or the associated drive element if the media is incompatible with the associated drive element. One method of avoiding this problem is to "encode" the universal data storage element 100 to identify the media stored therein. One encoding scheme is the use of physical or optical features on the exterior of housing 101. An example of such features shown in detail in FIG. 1B is the use of a pattern of ridges 104 or indentations (such as holes or slots) located on one side of housing 101, which pattern identifies the media contained within universal data storage element 100. A corresponding coding detection apparatus, such as a photodetector or a corresponding array of decoding pins, in the drive element detects the presence and pattern of holes 104 to determine whether the media contained in this universal data storage element 100 is compatible with the associated drive element. The presence of an incompatible media would abort the loading process prior to the drive element attempting to access the media contained within.

Coding Configuration

The coding apparatus used in data storage element 100 consists of a set of coding marks 104 which are mechanically imprinted into a least one exterior surface of the housing 101. Such coding marks 104 are positioned in a portion of the data storage element 100 indicated by the dotted line 151 in FIG. 1A. The area of the data storage element 100 indicated by the dotted line 151 is shown in greater detail in FIG. 1B. Referring to FIGS. 1A and 1B, the coding marks 104 consist of a linear array of apertures comprising a plurality of holes in one exterior surface of housing 101 and, in particular, in the front face of housing 101. The plurality of coding marks 104 are located within a rectangular area 106 located, for illustrative purposes, symmetrically about the center line of the data storage element (cartridge) 100 substantially juxtaposed to the opening 102. The rectangular area 106 contains up to six holes 104 configured in a linear array with three of the holes positioned on either side of the center line of the data storage element 100.

Write Inhibit Mark

One of these holes, for example the hole labeled 6 on FIG. 1B, is used to indicate the write inhibit status of the media contained within data storage element 100. This write inhibit hole 6 is settable by the user by means of a slider 107 that can be positioned to block or open the sixth hole in the linear array of holes 104 illustrated in FIG. 1B. Thus, the drive element can determine whether the files stored on this media are write inhibited by sensing whether hole 6 is blocked via the use of a photodetector positioned opposite this hole or by use of a sensing pin which probes the front surface of the data storage element 100 to determine whether the sixth or write inhibit hole is blocked by the slider 107.

Media Identification

The remaining five coding hole positions illustrated in FIG. 1B provide thirty-two possible coding configurations, since the presence or absence of a hole represents a binary data bit. Since the media is placed in the data storage element 100 by the manufacturer during the manufacturing process, the coding holes 104 are also placed on the front side of the data storage element 100 during the manufacturing process to reflect the type of media located inside of housing 101. Since the 3480-type magnetic tape cartridge form factor lends itself to use with tape media, there are a number of possible configurations of tape media that can be used within data storage element 100. For example, the tape media can be either of a magnetic or a optical writable nature. Similarly, the data recording format used on this tape media can vary from the standard helical multi-track format used in present tape drives to the longitudinal data recording format commonly found in video tape drive elements. Additionally, the tape media can be a standard thickness or a thin tape in order to control the length of tape that can be stored on reel 105. Additional coding information can be provided by use of coding holes 104 to indicate whether the tape media contained in housing 101 is of a thick or thin dimension and, more specifically, the nominal length of tape that is provided on reel 105. Since there are a finite number of standard tape lengths, this information represents only a few possible choices and does not preclude too many of the thirty-two possible coding variations provided by coding holes 104. Additionally, the type of coating that is used on the tape media is of significance for certain drive elements and coding information can reflect whether the magnetic coating applied to the tape media is of a standard iron-oxide or chromium dioxide or barium ferrite material composition.

The coding holes 104 cart reflect all of the physical characteristics of the tape media that is wound of reel 105 contained within the housing 101 of data storage element 100. In addition, the data format and content can similarly be reflected by appropriate selection of a pattern of the coding holes 104. Since the pattern of six holes illustrated in FIG. 1B represent but one embodiment of this concept, it is expected that various other configurations of coding holes are possible for use on the data storage element 100.

Coding Sole Configuration

The exact positioning and configuration of the coding holes 104 may be a function of the decoding apparatus used within the corresponding drive element in order to sense the presence or absence of the coding holes 104. In fact, the coding holes 104 need not be the round holes illustrated in FIG. 1B but can be rectangular slots cut into the front surface of housing 101 or a series of ridges embossed therein, which ridges would be mechanically sensible by a microswitch having a sensing wheel attached thereto. Finally, the rectangular area 107 can further be color coded in order to simplify identification of the media contained within the data storage element 100 by a human operator. The color coding can be a monochromatic designation that, as is illustrated in FIG. 1B, completely surrounds the pattern of coding holes 104 imprinted in the front surface of housing 101. Alternatively, a series of color bars can be used to reflect the five different manufacturer supplied coding holes 104.

In order to simplify the detection of the coding holes 104, a number of mechanical configurations can be used to implement this coding scheme. In particular, a shallow circular mark can be provided in each of the five positions illustrated in FIG. 1B to indicate the location of coding holes 104. Only the coding holes that are appropriate for this particular media type would be completed, thereby enabling mechanical or optical or operator differentiation between actual holes and simply hole positions. Similarly, the hole positions can be designated by a simple target color pattern identifying a hole position. This target designation may simplify differentiation between standard 3480-type magnetic tape cartridges and universal data storage element cartridges which contain a pattern of coding holes. The rectangular area 107 that is color coded can be a pre-machined color coded insert that is integrated into the front surface of housing 101 during the manufacturing process or an area that is colored after the manufacture of housing 101.

Alternate Embodiment

Figure 2:
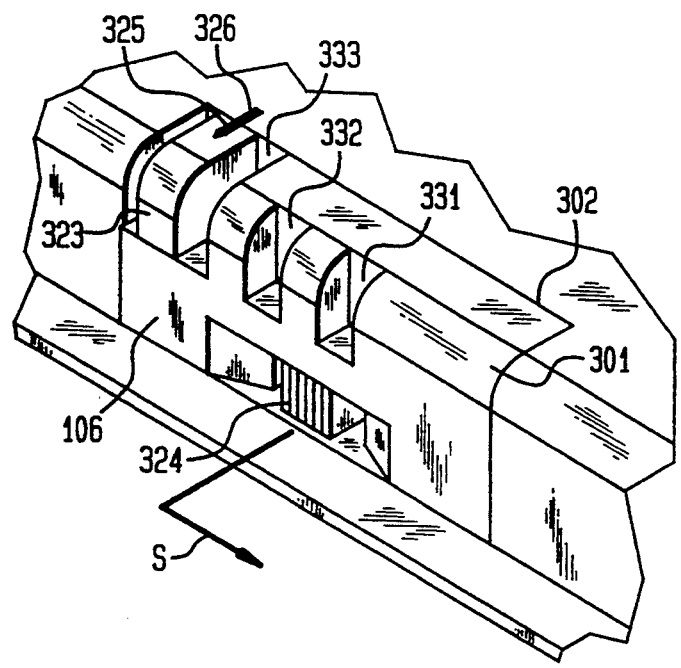
FIGS. 2-4 illustrate details of one embodiment of the array of coding holes and a write protect indication mechanism.
Figure 3:
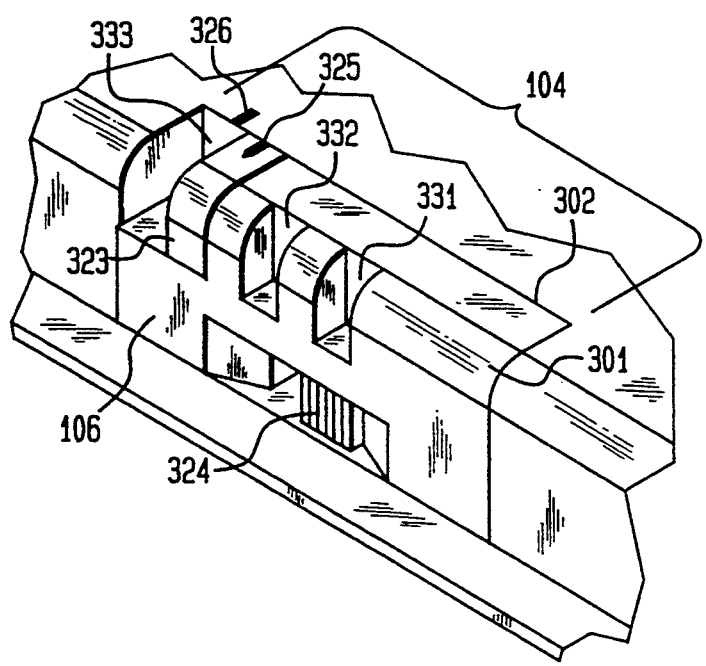
Figure 4:
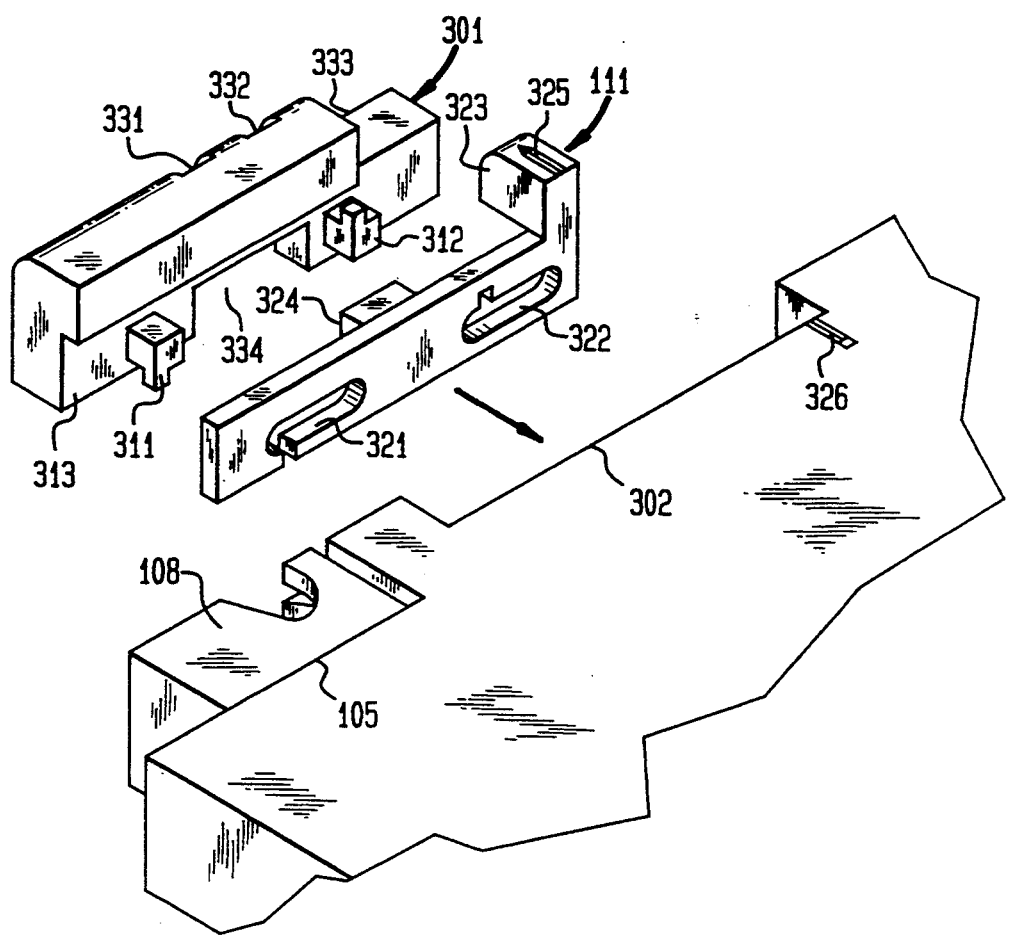

FIGS. 2–4 illustrate an alternative embodiment of the coding holes 104 on the front surface of housing 101. In particular, as noted above, the rectangular area 106 is implemented in the embodiment of FIGS. 2–4 as a recess 302 in the front surface of housing 101 substantially juxtaposed to the opening 102. The recess is substantially rectangular in shape and of predetermined dimensions and adapted to receive a premachined block of material 301 that has exterior dimensions that substantially match the dimensions of the recess 302. The premachined block 301 includes a plurality of apertures 104 therein arranged in a substantially linear array across the long dimension of the front surface of housing 101. The premachined block 301 of material is insertable into the recess 302 in a manner that the exterior surfaces of the premachined block 301 are substantially in alignment with the corresponding exterior surfaces of housing 101. Included in the plurality of apertures 104 in the premachined block, is at least one aperture 333 that is used to denote the write protect status of the tape media contained within the data storage element 100. As illustrated in attached figures, the write protect aperture 333 is substantially larger than the other apertures contained in the premachined block of material 301. The enlarged nature of this aperture 333 is such that it can accept a moveable member 323 that can be placed in one of two positions as illustrated respectively in FIGS. 2 and 3. In the position illustrated in FIG. 2, the projection is aligned with the extreme edge of the premachined block of material 301 and includes thereon a human readable mark 325 which aligns with a corresponding human readable mark 326 on a top surface of housing 101 to indicate when the projection 323 is in this position that the tape media contained within housing 101 is not write protected. The second position of this projection 323 is illustrated in FIG. 3 wherein it is moved to the opposite end of the enlarged aperture 333 and the human readable marks 325, 326 on this projection 323 and housing 101 no longer align to indicate to the user that the tape media contained within housing 101 cannot be written and the data storage element is therefore write protected. The movement of this projection 323 is accomplished by the use of a slide mechanism 111 (FIG. 4) which consists of an elongated piece of material having two projections: 323, 324 thereon. The first of these projections 323 represents the write enable defining projection that protrudes through the aperture 333 in the linear array of apertures 104 noted above. The second projection 324 is located at the opposite end of this member and protrudes through an opening 324 in the face of the premachined block of material 301 to enable a user to activate the slide mechanism to move between the positions illustrated in FIGS. 2 and 3. The premachined block of material 301 includes a recess 313 on the backside thereof which encloses at least part of the slide mechanism 111 to sandwich the slide mechanism 111 between the premachined block of material 301 and housing 101. Thus, the premachined block of material 301 when inserted into the recess 302 creates a channel between the premachined block of material 301 and the housing 101 in which the slide mechanism 111 is moveable by the user relocating the second projection 324 of the slide mechanism 111 between the two positions illustrated in FIGS. 2 and 3. The premachined block of material 301 can include the color coding noted above to illustrate in human readable form the contents of housing 101 without the user having to decode the linear array of apertures 104 contained in the premachined block of material 301.

Slide Mechanism for Coding Apertures

FIG. 4 illustrates an exploded view of the slide mechanism used to implement the plurality of apertures 104 illustrated in FIGS. 2 and 3. The premachined block 301 is shown in FIG. 4 from the back side thereof. The premachined block includes a pair of pins 311, 312 which pins are of a shape and configuration to fit through mating oval holes 321, 322, respectively, that are formed in slider 111. The tabs on the end of pins 311, 312 fit through corresponding openings that extend from the end of oval holes 321, 322 to enable slider 111 and block 301 to lock together in a slidable relationship. Slider 111 includes a projection 324 that fits through opening 334 in block 301 which projection 324 can be accessed by a user through opening 334 to move slider 111 in the direction S indicated in FIG. 2. The motion of slider 111 in direction S causes projection 323 located at one end of slider 111 to be moved from one end of the settable aperture 333 to the other to indicate the write protect status of magnetic tape 103 contained in helical scan tape cartridge 100. A mark 325 on the toe of projection 323 mates with a corresponding mark 326 imprinted on the top of cartridge housing 101. The alignment of marks 325 and 326 indicate the write enable status of the magnetic tape 103 as defined by the physical position of projection 323 within aperture 333. A lack of alignment of marks 325 and 326 indicate that projection 323 is placed in the opposite end of aperture 333 thereby clearly indicating to the associated helical scan transport that the magnetic tape 103 contained in helical scan tape cartridge 100 is write protected. Therefore, when slider 111 is coupled to block 301 by the use of pins 311 and 312 through mating oval holes 321 and 322, slider 111 can be moved in direction S by a user activating the slider 111 using projection 324 accessible through opening 334 to therefore manually define the aperture configuration 333 by relocating projection 323 therein. The remaining fixed apertures 331, 332 are mechanically inscribed into block 301 during the manufacturing process and fixedly define the various characteristics of magnetic tape 103 located in helical scan tape cartridge 100. It is obvious from viewing block 301 that a number of other aperture positions are available to be used on block 301. Therefore, the pattern of apertures 104 inscribed in block 301 is a function of the implementation of the magnetic tape 103 in the helical scan magnetic tape cartridge 100. Depending on the magnetic tape 103 inserted into exterior housing 101, different implementations of block 301 would be used to form the mechanism illustrated in FIGS. 2-4.

Write Protect Mechanism

As discussed above, the embodiment of the present invention illustrated in FIGS. 2-4 includes a write protect mechanism which is used to set and indicate the write protect status of the tape media contained within the data storage element. This feature of the present invention shall now be described in further detail with reference to FIG. 5, which illustrates a write protect mechanism 502 in accordance with a preferred embodiment of the present invention.

The write protect mechanism 502 operates to define a write protect state of a data storage media enclosed in a housing 501 of a data storage element. The write protect mechanism 502 includes an aperture 504 formed in an exterior surface (shown but not labeled) of the housing 501. Alternatively, the aperture 504 may be formed in a premachined block 301 (i.e., aperture 333) as shown in FIGS. 2-4, and as described above.

The aperture 504 includes a first end 510A and a second end 510B. The aperture 504 also includes a first portion 512A proximate the aperture first end 510A, and a second portion 512B proximate the aperture second end 510B. The aperture first portion 512A is adjacent to, but generally distinct from, the aperture second portion 512B.

Figure 5:
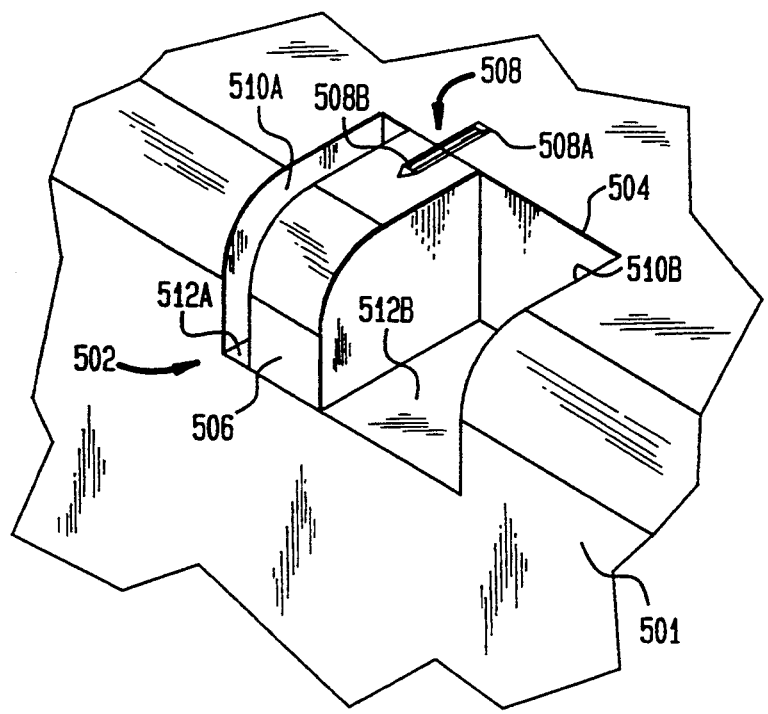
FIG. 5 illustrates details of a write protect indication mechanism in accordance with the present invention.

The write protect mechanism 502 also includes a movable member 506, preferably slidably secured within the aperture 504. The member 506 may be slidably secured within the aperture 504 using a slide mechanism similar to that shown in FIG. 4 and described above. The member 506 is manually slidable between a first position wherein the member 506 is positioned proximate the aperture first end 510A (as shown in FIG. 5), and a second position wherein the member 506 is positioned proximate the aperture second end 510B (similar to that shown in FIG. 3). While in the first position, the member 506 occupies the aperture first portion 512A. Similarly, while in the second position, the member 506 occupies the aperture second portion 512B.

A first human intelligible mark 508A is on the housing 501 proximate the aperture first end 5 10A, and a second human intelligible mark 508B is on the member 506. The first and second marks 508A, 508B may be placed on the housing 501 and the member 506, respectively, in any well known manner, such as by printing, machining, molding, affixing, etc. The first human intelligible mark 508A depicts a portion of a predetermined symbol 508, and the second human intelligible mark 508B depicts a remaining portion of the symbol 508. The second human intelligible mark 508B is alignable with the first human intelligible mark 508A by sliding the member 506 into the first position, as shown in FIG. 5.

The symbol 508 preferably corresponds to a write enabled state of the data storage media (wherein writing to the data storage media is permitted), and is preferably represented by an image which clearly connotes to a human operator the write protect state of the data storage media. Consequently, in accordance with the present invention, the human operator can easily, quickly, and accurately determine the write protect state of the data storage media by visual inspection of the write protect mechanism 502. As shown in FIG. 5, the symbol 508 is preferably represented by an image of a writing apparatus, such as a pencil. Alternatively, other readily recognizable indicia may also be used. For example, open and closed hasps mating with the body of a padlock may be suitable, as would be a circle with a diagonal line extending therethrough, as is often employed to indicated "NOT". In such an example, halves of the circle would be on the housing and movable member, respectively.

When the first and second human intelligible marks 508A, 508B are aligned (by moving the member 506 into the first position), the first and second human intelligible marks 508A, 508B depict an unbroken image of the symbol 508 (specifically, an unbroken image of the pencil), thereby clearly indicating that the data storage media is in the write enabled state. When the first and second human intelligible marks 508A, 508B are not aligned (by moving the member 506 into the second position), then the first and second human intelligible marks 508A, 508B depict a broken image of the symbol 508 (specifically, a broken image of the pencil), thereby indicating that the data storage media is in the write disabled state, or write protect state (wherein writing to the data storage media is not permitted).

As discussed above, the write protect mechanism 502 is intended for use with a data access device (for example, a tape drive element) having a sensor which interacts with the mechanism 502 to automatically determine the write protect state of the data storage media. In one embodiment, the data access device generally operates with the write protect mechanism 502 as follows. The sensor in the data access device determines that the data storage media is in the write enabled state when the sensor detects that the aperture first portion 512A is occupied by the member 506 (as noted above, the aperture first portion 512A is occupied by the member 506 by sliding the member 506 into the first position). The sensor in the data access device determines that the data storage media is in the write protect state when the sensor detects that the aperture second portion 512B is occupied by the member 506 (as noted above, the aperture first portion 512B is occupied by the member 506 by sliding the member 506 into the second position). The general operation of the sensor was described above.

It should be understood that the write protect mechanism 502 (shown in FIG. 5) may be implemented in an assembly as shown in FIG. 2, wherein the write protect mechanism 502 is a component of a premachined block 301, and wherein the member 506 is moved between a first position and a second position by manual manipulation of a projection 324. Alternatively, the aperture 504 of the write protect mechanism 502 may be formed directly in the exterior surface of the housing of the data storage element (as shown in FIG. 5), such that the member 506 is movable between the first position and the second position by direct manipulation of the member 506 by a human operator. In this alternate embodiment, the member 506 may be slidably secured within the aperture 504 using a mechanism similar to the slide mechanism discussed above. Other ways to movably secure the member 506 within the aperture 504 will be apparent to those skilled in the relevant art. For example, instead of a slidable mechanism, a member rotably positioned within an aperture may be used.

Figure 6:
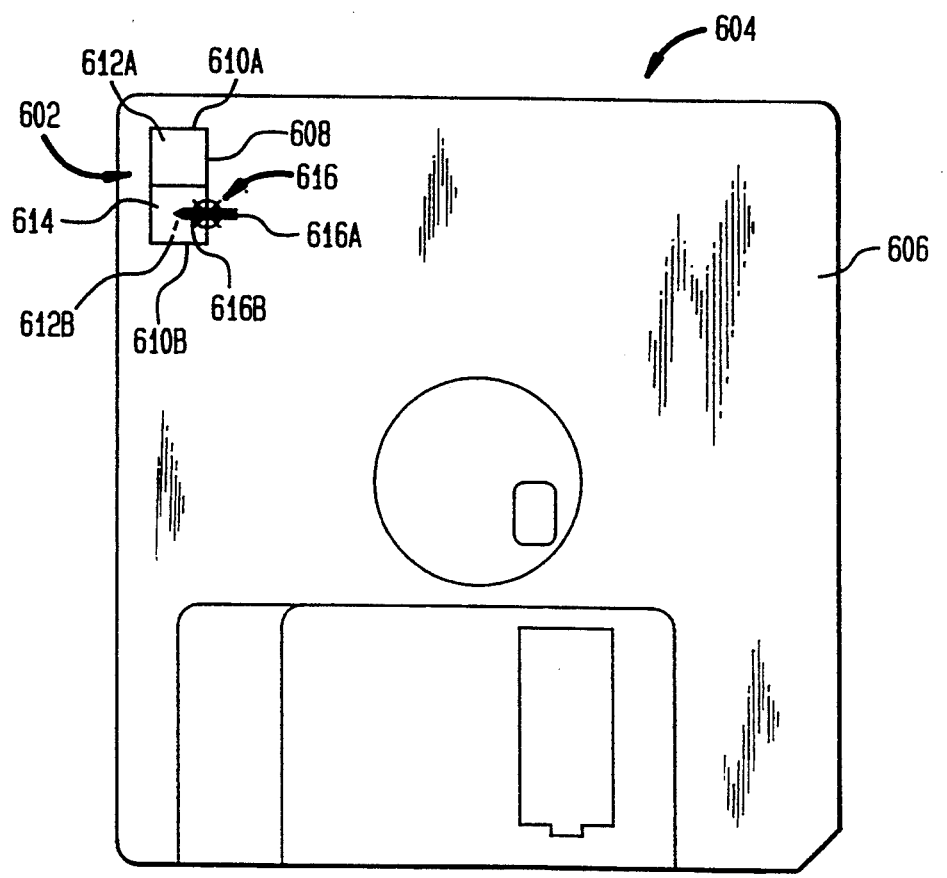
FIG. 6 illustrates details of a write protect indication mechanism in accordance with an alternate embodiment of the present invention.

It should also be understood that the write protect mechanism 502 is not limited to use with universal data storage elements as discussed above, but is instead applicable with any storage devices having multiple write protect states. For example, FIG. 6 illustrates a 3½ inch disk 604 typically used with data access devices (specifically, disk drives) often connected to personal computers.

In accordance with the present invention, the disk 604 includes a write protect mechanism 602 which is used to define a write protect state of a data storage media enclosed in a housing 606 of the floppy disk 604. The write protect mechanism 602 includes an aperture 608 formed in an exterior surface of the housing 606. The aperture 608 includes a first end 610A and a second end 610B.

The write protect mechanism 602 also includes a movable member 614 which is slidably secured within the aperture 608 (in a manner as discussed above, or using some other sliding mechanism which will be apparent to persons skilled in the relevant art). The member 614 is slidable between a first position wherein the member 614 is positioned proximate to the aperture first end 610A and a second position wherein the member 614 is positioned proximate the aperture second end 610B (as shown in FIG. 6).

A first human intelligible mark 616A is placed on the housing 606 proximate the aperture second end 610B, and a second human intelligible mark 616B is placed on the member 614. The second human intelligible mark 616B is alignable with the first human intelligible mark 616A by sliding the member 614 into the second position.

The first human intelligible mark 616A depicts a portion of a predetermined symbol 616. The second human intelligible mark 616B depicts a remaining portion of the symbol 616. In the embodiment shown in FIG. 6, the symbol 616 preferably corresponds to a write protect state of the data storage media contained within the housing 606 of the disk 604. Preferably, the symbol 616 is represented by a symbol which clearly connotes to a human operator the write protect state of the data storage media. Consequently, in accordance with the present invention, the human operator can easily, quickly, and accurately determine the write protect state of the data storage media by visual inspection of the write protect mechanism 602. For example, as shown in FIG. 6, the symbol 616 is represented by an image of a cross (or "X") superimposed on a pencil. Accordingly, when the first and second human intelligible marks 616A, 616B are aligned (by moving the member 614 into the second position), the first and second human intelligible marks 616A, 616B depict an unbroken image of the symbol 616, thereby clearly indicating that the data storage media is in the write protected state. When the first and second human intelligible marks 616A, 616B are not aligned (by moving the member 614 into the first position), the first and second human intelligible marks 616A, 616B depict a broken image of the symbol 616, thereby clearly indicating that the data storage media is in the write enabled state.

SUMMARY

The universal data storage element of the present invention provides a uniform media form factor of well defined exterior dimensions for a multitude of data storage media. The use of a consistent exterior housing form factor for the various types of media simplifies the data storage element storage and retrieval operation. A computer system can therefore be equipped with an automated library system or a uniform storage and retrieval system of a manual nature to handle diverse types of media. The use of the universal data storage element enables the user to store data on media that is appropriate for the nature of the data as well as provide a variable selection of drive elements for the computer system without the logistical complexities of diverse and incompatible media types. The universal data storage element supports various types of magnetic tape as well as predefined data management functions assigned to this particular media element.

The present invention also includes a write protect mechanism which is used to set and indicate the write protect status of the tape media contained within the data storage element. The write protect mechanism includes human intelligible means for clearly connoting to a human operator the write protect state of the data storage media. Consequently, in accordance with the present invention, a human operator can easily, quickly, and accurately determine the write protect state of the data storage media by visual inspection of the write protect mechanism.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A mechanism for defining a write protect state of a data storage media enclosed in a housing of a data storage element, the mechanism comprising:

an aperture formed in an exterior surface of the housing, the aperture having a first region and a second region;

a member, movably secured within the aperture, the member being manually movable between a first position wherein the member is positioned proximate the aperture first region, and a second position wherein the member is positioned proximate the aperture second region;

a first human intelligible mark on said housing proximate the aperture first region, the first human intelligible mark depicting a portion of a predetermined symbol corresponding to one of a write enabled state and a write protect state of the data storage media; and a second human intelligible mark on the member, the second human intelligible mark depicting a remaining portion of the symbol, the second human intelligible mark being alignable with the first human intelligible mark by sliding the member into the first region;

wherein the first and second human intelligible marks depict an unbroken image of the symbol when the first and second human intelligible marks are aligned, thereby indicating that the data storage media is in the one of the write enabled state and the write protect state, and wherein the first and second human intelligible marks depict a broken image of the symbol when the first and second human intelligible marks are not aligned, thereby indicating that the data storage media is in another of the write enabled state and the write protect state of the data storage media.

2. The mechanism of claim 1, wherein the symbol corresponds to the write enabled state of the data storage media, and wherein the symbol comprises an image of a writing apparatus.

3. The mechanism of claim 1, wherein the symbol corresponds to the write protect state of the data storage media, and wherein the symbol comprises an image of a cross superimposed on a writing apparatus.

4. The mechanism of claim 1, wherein the data storage media is a magnetic tape reel.

5. A mechanism for defining a write protect state of a data storage media enclosed in a housing of a data storage element, the mechanism for use with a data access device having a sensor which interacts with the mechanism to determine the write protect state of the data storage media, the mechanism comprising:

an aperture formed in an exterior surface of the housing, the aperture having a first region and a second region;

a member, movably secured within the aperture, the member being manually moveable between a first position wherein the member occupies a first portion of the aperture proximate the aperture first region, the sensor capable of determining that the storage media is in one of a write enabled state and a write protect state when the sensor detects that the aperture first portion is occupied by the member, and a second position wherein the member occupies a second portion of the aperture proximate the aperture second region, the sensor capable of determining that the storage media is in another of the write enabled state and the write protect state when the sensor detects that the aperture second portion is occupied by the member;

a first human intelligible mark on said housing proximate the aperture first region, the first human intelligible mark depicting a portion of a predetermined symbol corresponding to the one of the write enabled state and the write protect state of the data storage media; and a second human intelligible mark on the member, the second human intelligible mark depicting a remaining portion of the symbol, the second human intelligible mark being alignable with the first human intelligible mark by sliding the member into the first position;

wherein the first and second human intelligible marks depict an unbroken image of the symbol when the first and second human intelligible marks are aligned, thereby indicating that the data storage media is in the one of the write enabled state and the write protect state, and wherein the first and second human intelligible marks depict a broken image of the symbol when the first and second human intelligible marks are not aligned, thereby indicating that the data storage media is in the other of the write enabled state and the write protect state of the data storage media.

6. The mechanism of claim 5, wherein the symbol corresponds to the write enabled state of the data storage media, and wherein the symbol comprises an image of a writing apparatus.

7. The mechanism of claim 5, wherein the symbol corresponds to the write protect state of the data storage media, and wherein the symbol comprises an image of a cross superimposed on a writing apparatus.

* * * * *